United States Patent Office 3,433,249
Patented Mar. 18, 1969

3,433,249
LIQUID LEVEL CONTROLLER
Kurt Nelson, Wappingers Falls, N.Y., assignor to The De Laval Separator Company, Poughkeepsie, N.Y., a corporation of New Jersey
Filed Mar. 22, 1965, Ser. No. 441,480
U.S. Cl. 137—390        9 Claims
Int. Cl. F16k 21/18; F16b 5/00

ABSTRACT OF THE DISCLOSURE

A cylinder forms a piston chamber connected by a duct to a pneumatically actuated device for operating a valve which supplies liquid to a tank, the cylinder having first and second cavities at opposite ends of the piston slidable therein. The first cavity communicates with the duct, and the second cavity has a throttled flow connection to a pneumatic pipeline and also has a port opening to atmosphere and provided with a greater through-flow area than the throttled flow connection. The piston has a first normal operating position in which it vents the duct to atmosphere to operate the pneumatic device so as to close the supply valve, the piston also having a second normal operating position for connecting the duct to the pneumatic pipeline and thereby causing said device to open the supply valve. A control valve normally closes the port to atmosphere to allow the pneumatic line to maintain in the second cavity a pressure operable to cause displacement of the piston to its second normal position, and means responsive to rising of the liquid to a predetermined level in the tank serve to actuate the control valve to open the port, the piston having biasing means operable to shift the piston from its second to its first normal position in response to opening of the port, whereby the second cavity is connected to atmosphere to allow the biasing means to hold the piston in its first position.

---

This invention relates to apparatus for automatically maintaining a substantially constant liquid level in a tank, or the like, through actuation of a valve controlling the supply of liquid to the tank. It relates more particularly to apparatus for this purpose in which actuation of the liquid supply valve is effected pneumatically, that is, from a source of either superatmospheric or subatmospheric pressure.

The new apparatus is of simple construction, may be readily adjusted to vary the desired liquid level to be maintained, and responds quickly to close the liquid supply valve when the desired level is attained and to reopen the valve when the liquid level falls slightly below the desired level.

According to the present invention, the liquid supply valve is operated by a pneumatic device which is connected through a duct to a cylinder having a piston chamber. The cylinder forms first and second cavities at opposite ends, respectively, of a piston slidable in the chamber, the first cavity communicating with the duct. A pneumatic pipeline leads to the piston chamber and has a throttled flow connection to the second cavity, the latter having a port opening to atmosphere and provided with a greater throughflow area than the throttled flow connection. The piston is biased by suitable means toward a first position where it vents to atmosphere the duct which is connected to the pneumatic device for operating the supply valve, so as to close that valve. The piston is movable against the biasing means to a second position for connecting the duct to the pneumatic pipeline and thereby opening the pneumatically operated supply valve. A control valve normally closes the aforementioned port to atmosphere, thereby allowing the pneumatic line to maintain in the second cavity a pressure operable to cause displacement of the piston to its second position. The apparatus also comprises means responsive to rising of the liquid to a predetermined level in the tank for actuating the control valve to open the port, whereby the second cavity is connected to atmosphere to allow the biasing means to hold the piston in its first position.

The preferred construction of the new control apparatus includes a biasing element urging the control valve to its position for closing the atmospheric port, and means for adjusting the bias of this element to vary the predetermined liquid level to be maintained in the tank. Also, a manually operable member is preferably connected to the piston for selectively holding it in either of its two positions.

Figure 1:
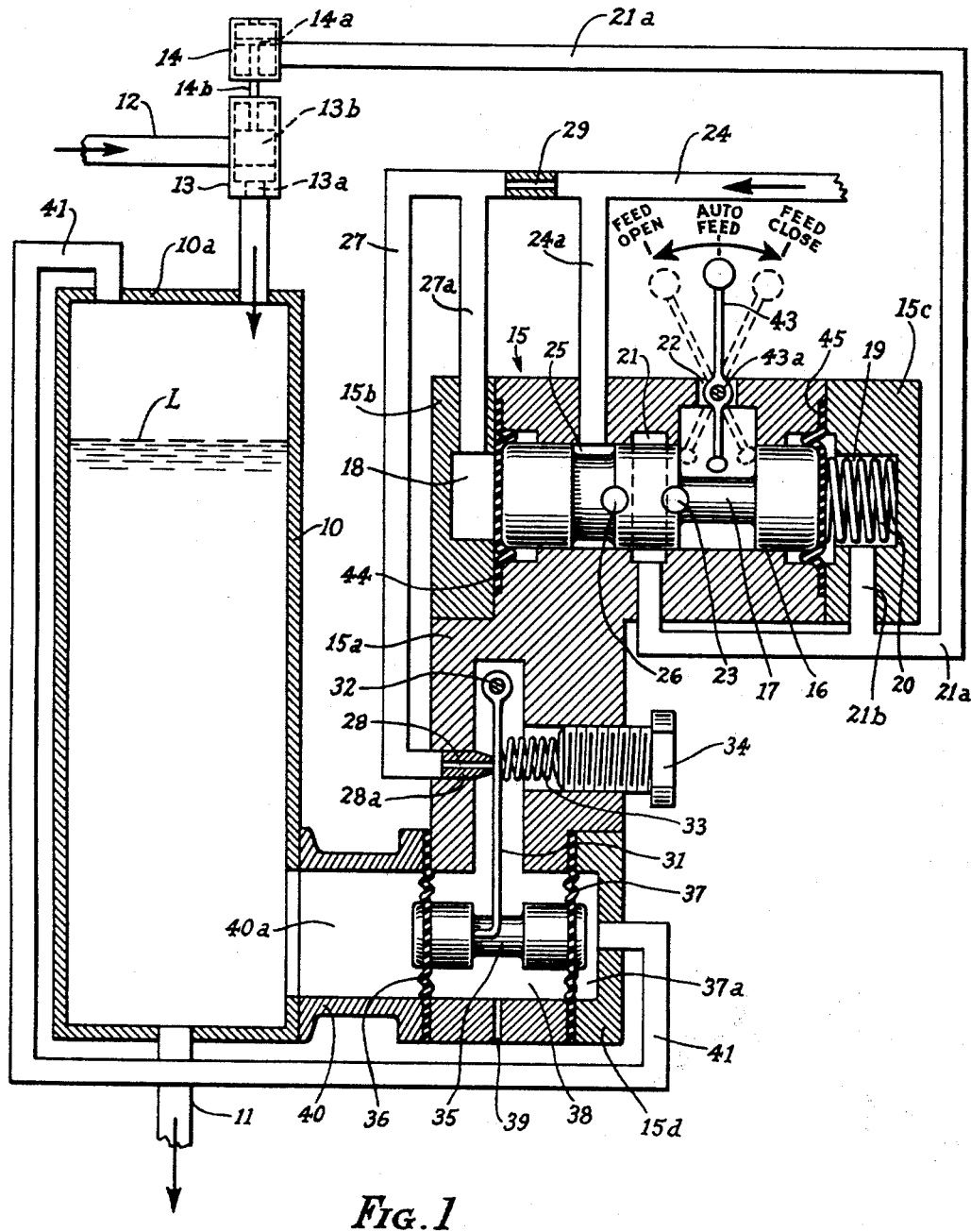
Figure 2:
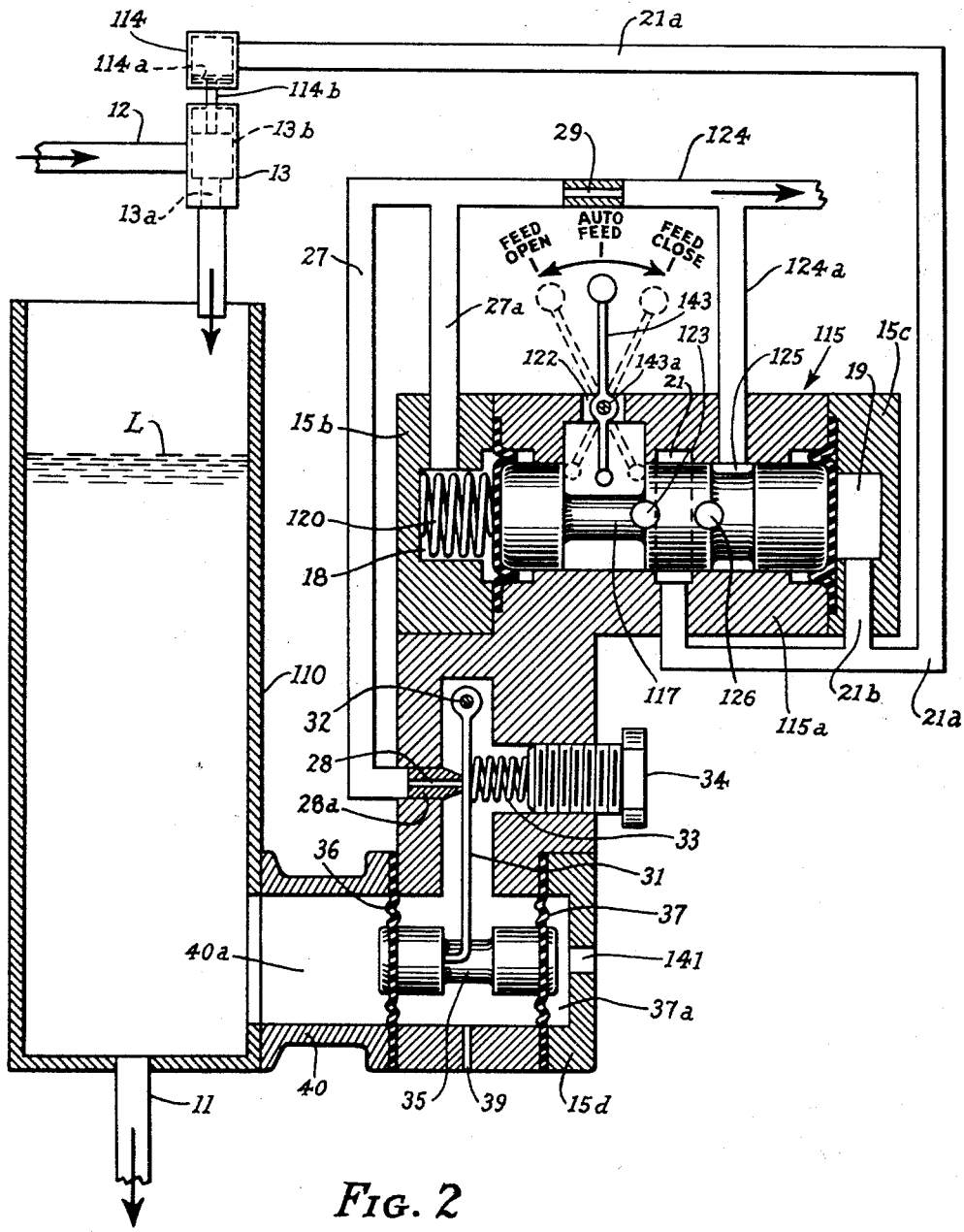

For a better understanding of the invention, reference may be had to the accompanying drawings in which:

FIG. 1 is a schematic view, partly in vertical section, of one form of the new apparatus in which the control is effected from a pneumatic line under superatmospheric pressure, and FIG. 2 is a view similar to FIG. 1 but showing a modified form of the apparatus in which the control is effected from a pneumatic line under subatmospheric pressure.

Referring to FIG. 1, the apparatus there shown comprises a tank 10 having a bottom outlet formed by a liquid discharge pipe 11. The tank is adapted to be supplied with liquid from a feed pipe 12 through a feed valve 13. The latter has an outlet passage 13a leading to the upper part of the tank and which is normally closed by a valve element 13b slidable in a vertical bore in the valve housing. The valve element 13b is movable by a pneumatic device 14 comprising a piston 14a connected through a stem 14b to the valve element 13b, this piston being subjected on its upper surface to atmospheric pressure and on its lower surface to the pressure in a duct 21a to be described in more detail presently.

When the duct 21a is placed under superatmospheric pressure, the latter acts to raise piston 14a and valve element 13b so as to admit liquid to tank 10 from supply pipe 12; and when duct 21a is placed under atmospheric pressure, the piston 14a and valve element 13b return to their lowermost positions as illustrated, wherein the feed of liquid to tank 10 is cut off.

A cylinder 15 forms a piston chamber 16 and comprises a main section 15a provided with opposite end sections 15b and 15c. A piston 17 is slidable lengthwise in the cylinder chamber 16, the cylinder sections 15b and 15c defining cavities 18 and 19, respectively, at opposite ends of the piston. A compression spring 20 in cavity 19 constitutes a means for biasing the piston toward a first position against a stop formed by cylinder section 15b. The cylinder forms an annular passage 21 surrounding and communicating with the piston chamber 16 intermediate its ends; and between the passage 21 and cavity 19, the cylinder has a vent opening 22 leading to atmosphere from the piston chamber 16. The cylinder passage 21 is connected to duct 21a leading to the pneumatic actuator 14. Passage 21 is also connected through a branch 21b to the cylinder cavity 19, so that the latter will always be under the pressure existing in duct 21a and the pneumatic actuator 14.

In the first position of piston 17, as shown in FIG. 1, the cylinder passage 21 is connected to the atmospheric vent 22 through a port 23 in the piston. Thus, the duct 21a and cavity 19 are under atmospheric pressure, whereby the pneumatically operated valve 13 is closed to prevent supply of liquid to the tank.

A pneumatic pipeline 24 is connected to a source of superatmospheric pressure (not shown) and has a branch 24a leading to cylinder 15. More particularly, the branch 24a leads to the piston chamber 16 at an annular recess 25 formed by piston 17 between passage 21 and cavity 18. In the first position of the piston, as shown in FIG. 1, the piston blocks the cylinder passage 21 from the recess 25 and pneumatic pipeline 24–24a. However, when piston 17 is moved to its second position against the action of spring 20, the cylinder passage 21 is placed in communication with the recess 25 and pneumatic line 24–24a through a port 26 in the piston, and at the same time the piston port 23 moves to the right so as to break the communication between passage 21 and the vent opening 22 to atmosphere. This second position of the piston is determined by abutment with the cylinder end section 15c.

Through ducts 27 and 27a, the cylinder cavity 18 is provided with a port 28 opening to atmosphere and is connected to the pneumatic pipeline 24 by a throttled flow connection 29. The throttle 29 has a throughflow area somewhat less than that of the port 28 to atmosphere. For example, the diameter of the throughflow area in throttle 29 may be .012" compared to a diameter of .025" for the port 28. Thus, when the latter is opened, it exhausts air from passage 27 and cavity 18 more rapidly than air is supplied to this passage and cavity through throttle 29, whereby the pressure in cavity 18 decreases to atmospheric pressure so as to allow spring 19 to hold the piston 17 in its first position against cylinder section 15b.

The port 28 for venting cavity 18 to atmosphere is formed by a nozzle 28a and is adapted to be closed by a control valve 31. The latter valve, as illustrated, is in the form of a lever pivoted at its upper end in a depending portion of the main section 15a of cylinder 15, as shown at 32. Lever 31 is normally biased against the tip of nozzle 28a to close the port 28. For this purpose, I provide a compression spring 33 interposed between lever 31 and an adjustment screw 34 threaded in the cylinder section 15a. Thus, the screw 34 constitutes a means for adjusting the biasing element or spring 33.

It will be understood that when the control valve or lever 31 is swung against the tip of nozzle 28a, the restricted flow of air through throttle 29 from the pneumatic pipeline 24 creates a superatmospheric pressure in cylinder cavity 18, thereby causing piston 17 to move to its second position against the action of spring 20.

At its lower end, the lever 31 is connected to a stud 35 secured at its ends to a pair of diaphragms 36 and 37, which form with the cylinder section 15a a chamber 38 located between the diaphragms. The chamber 38 is maintained at atmospheric pressure by a vent opening 39 and communicates with the port 28 leading from air passage 27. As shown, diaphragm 37 is clamped to cylinder section 15a by a plate 15d, and diaphragm 36 is clamped to cylinder section 15a by a nipple 40. The latter forms a passage 40a leading to the lower portion of tank 18, so that diaphragm 36 is subjected to the pressure in this lower portion. The tank 10 is shown with a top 10a which closes the upper portion of the tank to atmosphere, and this upper portion is connected through a pipe 41 to the space 37a formed between end plate 15d and diaphragm 37. The latter, therefore, is subjected to whatever air pressure exists in the upper portion of the tank.

A lever 43 is pivotally mounted in the vent opening 22 of cylinder 15, as shown at 43a. The inner end of this lever is operatively connected to piston 17. When the outer end of lever 43 is swung to the left, it moves piston 17 to its second position against the action of spring 20, thereby holding the liquid supply valve 13 in its open position. When the outer end of lever 43 is swung to its extreme right-hand position, piston 17 is held in its first position against cylinder section 15b, whereby the liquid supply valve 13 is held closed. With lever 43 in its intermediate position (shown in full lines in FIG. 1) and free to move, the control apparatus functions automatically in a manner to be described presently.

Flexible sealing members 44 and 45 engage the opposite ends of piston 17 and are clamped between the main cylinder section 15a and the end sections 15b and 15c, respectively.

Assume that tank 10 is empty and that it is desired to maintain liquid therein at a level L. The outer end of lever 43 is first swung to the left to its "Feed Open" position to hold piston 17 in its right-hand position against the action of spring 20. Air then flows from pneumatic line 24–24a through piston recess 25, piston port 26, cylinder passage 21 and duct 21a to the pneumatic actuator 14, thereby raising valve member 13b to admit liquid to tank 10. During the initial filling of the tank, the pressure in its lower portion acting through passage 40a on diaphragm 36 is insufficient to overcome the biasing action of spring 33, so that nozzle port 28 remains closed by lever 31. Consequently, cylinder cavity 18 remains under superatmospheric pressure from the pneumatic pipeline 24. However, since the same superatmospheric pressure exists in duct 21a and cylinder cavity 19, it is necessary to maintain lever 43 in its "Feed Open" position to prevent spring 20 from returning the piston to its left-hand position.

When the liquid in tank 10 reaches the desired level L, the liquid pressure on diaphragm 36 becomes sufficient to overcome the biasing action of spring 33 and thereby swing valve lever 31 to the right, opening the port 28 to atmosphere. Manually operated lever 43 is then released to its intermediate or "automatic feed" position. Since cylinder cavity 18 is now at atmospheric pressure, due to air exhaust through outlet 28, spring 20 returns the piston to its first position against cylinder section 15b. As a result, duct 21a is disconnected from the pneumatic line 24–24a and is connected through cylinder passage 21, piston port 23 and vent 22 to atmosphere, whereby the pneumatic actuator 14 returns the liquid feed valve 13 to its closed position to cut off the supply of liquid to tank 10.

When the liquid level in tank 10 descends below the desired level L due to discharge through tank outlet 11, the pressure acting on diaphragm 36 through passage 40a becomes insufficient to balance the force of biasing element 33. The latter then swings valve lever 31 against the tip of nozzle 28a to close the port 28 to atmosphere. This causes the pressure in cylinder cavity 18 to build up rapidly to the superatmospheric pressure in pipeline 24 so as to move piston 17 to its right-hand position against the action of spring 20, it being understood that cavity 19 at this instant is under atmospheric pressure resulting from its previous communication through ducts 21b–21a, cylinder passage 21 and piston port 23 to the atmospheric vent 22. As a consequence of this piston movement to its right-hand position, duct 21a is placed under superatmospheric pressure from pneumatic pipeline 24, as previously described, to open the liquid feed valve 13. This opening of the feed valve is only momentary due to the fact that superatmospheric pressure is rapidly built up in cylinder cavity 19, through the branch passage 21b, causing spring 20 to return piston 17 to its left-hand position and thereby reclose the liquid feed valve 13 by venting duct 21a to atmosphere. However, if the liquid in tank 10 is not restored to the desired level L as a result of this momentary opening of feed valve 13, the nozzle port 28 will remain closed by valve lever 31, whereby the continuing superatmospheric pressure in cylinder cavity 18 will force the piston 17 to its right-hand position against spring 20 when the pressure in cavity 19 has been restored to atmospheric pressure by venting through piston port 23 and vent opening 22. Thus, feed valve 13 will again be opened momentarily.

This fluctuating of piston 17 will continue, momentarily opening and closing the liquid feed valve 13, until the liquid is returned to the desired level L in tank 10. When this level is attained, the liquid pressure on diaphragm 36 swings valve lever 31 against the biasing spring 33 to open the nozzle port 28 and restore the cylinder cavity 18 to atmospheric pressure, thereby allowing spring 20 to maintain piston 17 in its left-hand position so as to hold the liquid feed valve 13 closed. Valve 13 will remain closed, of course, until the liquid in tank 10 again descends below the desired level L so as to close nozzle port 28, whereupon the previously described level restoring action is repeated.

It will be apparent that by adjusting screw 34 to reduce the compression of spring 33, the liquid level automatically maintained in tank 10 is decreased, and vice versa. It will also be apparent that changes in the air pressure above the liquid level in tank 10 cannot affect the level responsive means 36–37 because such changes also occur in the space 37a adjacent diaphragm 37, due to the connecting pipe 41. For example, while an increase in the air pressure above the liquid level will tend to increase the pressure on the liquid side of diaphragm 36, this tendency is counteracted by a corresponding increase in the opposing pressure acting on diaphragm 37 in space 37a.

Although some of the flow passages are shown as being provided exteriorly of cylinder 15, as by ducts 27–27a, throttle 29 and the duct communicating with cavity 19, it is obvious that such passages may be arranged in the cylinder 15 itself.

Apparatus according to the present invention may be operated from a pneumatic line of the suction type rather than the superatmospheric pressure line 24, with only slight modification of the FIG. 1 apparatus, as will now be described.

In FIG. 2, the parts identical to parts in FIG. 1 are provided with the same reference numerals as in FIG. 1, and the parts not identical but equivalent to parts in FIG. 1 have the same reference numerals as in FIG. 1 preceded by the number "1."

Referring to FIG. 2, a pneumatic suction line 124 replaces the superatmospheric pressure line 24 in FIG. 1; and the biasing spring 20 in FIG. 1 is replaced by a spring 120 located in cylinder cavity 18. This spring urges piston 117 to a first position against the cylinder end section 15c, as shown in FIG. 2. In this first position of the piston, duct 21a is connected through cylinder passage 21, piston port 123 and vent 122 to atmosphere. With the resulting atmospheric pressure in pneumatic actuator 114, its piston 114a is in a lowered position in which the liquid supply valve 13 is closed. The piston 117 is movable to the left against the action of spring 120 to a second position, in which it abuts against the cylinder end section 15b. In this second position of the piston, duct 21a is connected through cylinder passage 21, piston port 126, piston recess 125 and duct 124a to the suction line 124. The resulting partial vacuum in the pneumatic actuator 114 causes its piston 114a to move upwardly and thereby open the liquid supply valve 13.

To fill the tank 110 initially to the desired level L, the upper end of manually operated lever 143 is held in its right-hand position so as to retain piston 117 in its second position against the action of spring 120, whereby liquid supply valve 13 is held open as previously described. Until the liquid reaches the preset level L, the port 28 remains closed by valve 31 so that suction line 124 maintains a partial vacuum in cylinder cavity 18. When the level L is attained, the resulting opening of port 28 releases the partial vacuum in cavity 18 and thus allows spring 120 to return piston 117 to its first position upon release of the manually operated lever 143.

In the automatic operation of the apparatus, when the liquid level falls below the present level L, the closing of port 28 reestablishes the partial vacuum in cavity 18 so that the atmospheric pressure in the opposing cavity 19 moves the valve to its second position against the force of spring 120. The resulting pressure drop in duct 21a opens the liquid supply valve 13 until sufficient suction is created in cavity 19 to allow spring 120 to return piston 117 to its first position. If port 28 remains closed despite this momentary opening of feed valve 13, the return of atmospheric pressure to cavity 19 will again move piston 117 to the left due to the continuing partial vacuum in cavity 18, thereby reopening the liquid supply valve 13 momentarily. As soon as the liquid has been restored to the desired level L so as to vent the cavity 18 to atmosphere through port 28, the spring 120 holds piston 117 in its first position corresponding to a closed position of supply valve 13.

In the FIG. 2 embodiment of the invention, tank 110 is open at the top. Consequently, the pipe 41 of FIG. 1 is omitted and the space 37a is maintained at atmospheric pressure through port 141.

I claim:

1. In combination with a tank having a liquid outlet and a valve for supplying liquid to the tank, apparatus for controlling the liquid level in the tank comprising a pneumatically actuated device connected to the supply valve for operating the same, a cylinder forming a piston chamber, a duct connecting the piston chamber to said pneumatic device, a piston slidable in said chamber the cylinder having first and second cavities at opposite ends, respectively, of the piston, said first cavity communicating with said duct, a pneumatic pipeline leading to the piston chamber, said second cavity having a throttled flow connection to the pneumatic pipeline and also having a port opening to atmosphere and provided with a greater through-flow area than said throttled flow connection, the piston having a first normal operating position in which it vents said duct to atmosphere to operate said device to close the pneumatically operated supply valve, the piston having a second normal operating position for connecting said duct to the pneumatic pipeline and thereby causing said device to open the pneumatically operated supply valve, a control valve normally closing said port to atmosphere to allow the pneumatic line to maintain in said second cavity a pressure operable to cause displacement of the piston to said second position, and means responsive to rising of the liquid to a predetermined level in the tank for actuating the control valve to open said port, said piston having biasing means operable to shift the piston from said second to said first normal position in response to said opening of the port, whereby the second cavity is connected to atmosphere to allow said biasing means to hold the piston in said first position.

2. The combination defined in claim 1, in which said pneumatic pipeline is under superatmospheric pressure.

3. The combination defined in claim 1, in which said pneumatic pipeline is under subatmospheric pressure.

4. The combination according to claim 1, in which said biasing means include a spring.

5. The combination according to claim 1, comprising also a biasing element urging said control valve to close said port.

6. The combination according to claim 1, comprising also a biasing element urging said control valve to close said port, and means for adjusting the bias of said element to vary said predetermined level.

7. The combination according to claim 1, comprising also a manually operable member connected to the piston for selectively holding the piston in one of said positions.

8. The combination according to claim 1, in which said tank is open to atmosphere above said predetermined level, said means responsive to rising of the liquid including movable means having one side subjected to the liquid pressure in the lower portion of the tank and an opposing side subjected to atmospheric pressure.

9. The combination according to claim 1, in which said tank is closed to atmosphere above said predetermined level, said means responsive to rising of the liquid including movable means having one side subjected to the liquid pressure in the lower portion of the tank and an opposing side subjected to the pressure above said predetermined level.

References Cited
UNITED STATES PATENTS

| | | | |
|---|---|---|---|
| 2,356,970 | 8/1944 | Brockett | 137—413 |
| 2,597,138 | 5/1952 | Trigg | 137—82 X |
| 2,737,973 | 3/1956 | Kimmell | 137—84 X |
| 2,811,314 | 10/1957 | Lund | 137—85 X |
| 2,950,703 | 8/1960 | Fletcher | 137—625.62 X |

ALAN COHAN, *Primary Examiner.*

U.S. Cl. X.R.

137—85, 84, 403